J. LE C. DAVIS, DEC'D.
WESTINGHOUSE ELECTRIC AND MFG. COMPANY, ASSIGNEES.
DYNAMO ELECTRIC MACHINE.
APPLICATION FILED MAY 4, 1915.
Reissued Oct. 2, 1917.
14,370.
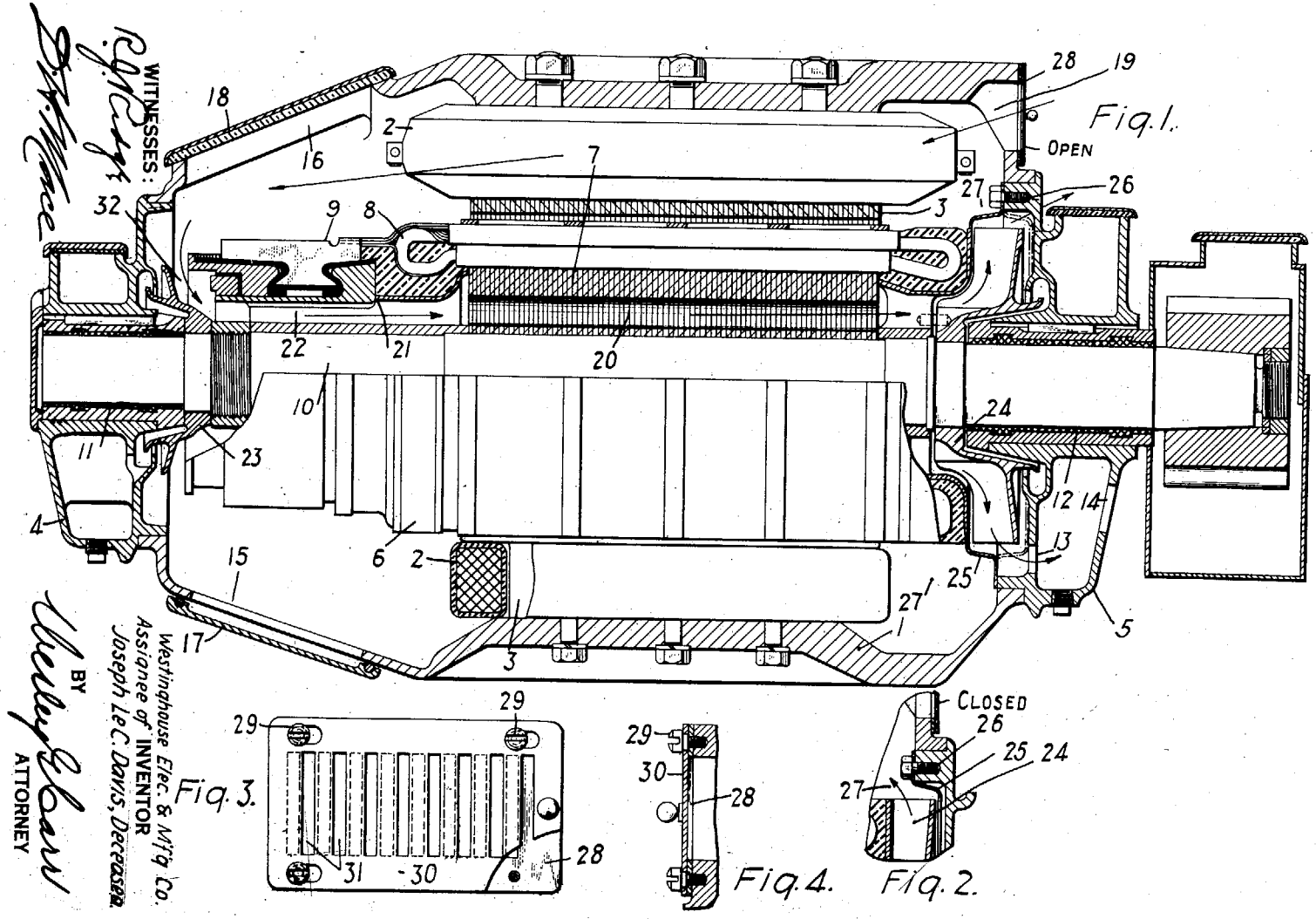
WITNESSES:
R. J. Ruggs
D. W. Mace
Westinghouse Elec. & Mfg. Co.
Assignee of INVENTOR
Joseph Le C. Davis, Deceased.
BY Wesley G. Carr
ATTORNEY

UNITED STATES PATENT OFFICE.

JOSEPH LE C. DAVIS, DECEASED, LATE OF PITTSBURGH, PENNSYLVANIA, BY WESTINGHOUSE ELECTRIC AND MFG. COMPANY, ASSIGNEES.

DYNAMO-ELECTRIC MACHINE.

14,370. Specification of Reissued Letters Patent. Reissued Oct. 2, 1917.

Original No. 1,115,406, dated October 27, 1914, Serial No. 703,632, filed June 14, 1912. Application for reissue filed May 4, 1915. Serial No. 25,839.

*To all whom it may concern:*

Be it known that JOSEPH LE C. DAVIS, deceased, late of Pittsburgh, in the county of Allegheny and State of Pennsylvania, during his lifetime invented certain new and useful Improvements in Dynamo-Electric Machines, and that the WESTINGHOUSE ELECTRIC AND MANUFACTURING COMPANY, a corporation organized and existing under the laws of Pennsylvania, assignee of JOSEPH LE C. DAVIS, now deceased, hereby declares to the best of its knowledge and belief that the following specification, taken in connection with the drawings furnished and forming a part of the same, is a clear, true, and complete description of said improvement.

My invention relates to dynamo-electric machines, and it has special reference to the ventilation of motors of the railway type and similar machines which are liable to become overheated in service.

One of the objects of my invention is to provide a machine of the class above indicated that shall embody simple and efficient means for effectively preventing the overheating of any of its parts under different conditions of operation.

Another object of my invention is to provide an electric motor of the inclosed railway type that shall be adapted for forced ventilation through the agency of a suitable fan that is associated with its armature and which, moreover, shall embody simple and adequate means for converting the motor from an externally ventilated machine to an internally ventilated structure, or vice versa, in order to meet different conditions of operation.

Still another object of my invention is to provide a convertible railway motor of the class referred to, the parts of which shall be so arranged and constructed as to permit of adapting the motor for either form of ventilation with comparative ease and a minimum of expense and number of parts.

I am aware that fans and other similar devices have formed parts of the rotatable members of dynamo-electric machines, but, to my knowledge, such machines have not been provided hitherto with convertible means adapted to produce either an entirely local circulation of ventilating air within the frame of an inclosed motor, or similar machine, or a circulation of air from outside of the frame through a suitable inlet opening, around and through the heated parts of the machine and out at another point.

According to my present invention, I provide a structure having the above specified characteristics which are of special values in motors of the railway type.

Figure 1 of the accompanying drawing is a view, partially in section and partially in side elevation, of a railway motor embodying my invention. Fig. 2 is a fragmentary view, corresponding to a portion of Fig. 1, illustrating the reversible deflector shown in Fig. 1 as occupying a different position, and Figs. 3 and 4 are detail views of the damper or grid which is shown in Fig. 1.

Referring to the drawing, the machine here shown comprises a stationary frame 1, having field magnet coils 2 mounted upon polar projections 3, bearing housings 4 and 5, an armature 6 having a laminated core member 7, a winding 8, a commutator cylinder 9 and a shaft 10.

The armature 6 is mounted upon the shaft 10 which is rotatively supported in bearings 11 and 12 that are respectively carried by the bearing housings 4 and 5.

The frame 1 substantially incloses the polar members 3 and armature 6 and is provided with end outlet openings 13 and 14 through the housing 5, openings 15 and 16 which are closed by commutator covers 17 and 18, and an inlet opening 19 through which cool ventilating air may be admitted to the interior of the frame 1.

The laminated core member 7 of the armature is provided with longitudinal passages 20, and a spider 21, upon which the commutator cylinder 9 is mounted, is provided with passages 22 to register with the passages 20.

A deflector ring 23 is mounted on the shaft 10 adjacent to the bearing 11, and a combined fan and deflector 24 is mounted on the shaft 10 adjacent to the bearing 12. An annular deflector or baffle 25 is removably secured within the frame 1 and to the housing 5 by means of bolts 26, and is adapted to be detached and reversed in position, if desired, to direct the circulation of air created by the fan 24, when the motor is in operation, either outwardly through the openings 13 and 14 or inwardly through a passage 27 between the housing 5 and the adjacent end of the winding 8 (see Fig. 2).

If the frame 1 is composed of two separable parts, access to the member 25 for effecting its reversal may be had by separating such parts, but, if the frame is of the one-piece or so-called box type, access may be had to the member 25 for effecting its reversal by removing some of the adjacent parts of the motor structure.

In the position shown in Fig. 1, the deflector 25 serves to provide a barrier between the inlet opening 19 and the outlet openings 13 and 14 and to direct the heated ventilating air through the discharge openings 13 and 14 in the housing 5, while, in its reversed position, as shown in Fig. 2, the deflector performs the function of closing the outlet openings 13 and 14. Obviously, having removed the deflector 25 from the position shown in Fig. 1, any suitable means may be employed for blocking the openings 13 and 14, although the deflector 25 may be reversed and conveniently used.

The inlet opening 19 is preferably provided with an adjustable damper comprising a stationary grid 28 that is secured to the frame 1 by bolts 29 and a sliding grid 30 which is held in position by the heads of the bolts 29 but is adapted to slide longitudinally with reference to the grid 28 and either register with it to provide a series of openings 31 or to cover the openings in the under grid and thus close the inlet opening 19. Other suitable means for accomplishing the desired ends may, of course, be employed.

If the motor operates under a street car or in any other position where it is liable to be exposed to the weather and severe conditions, the inlet openings 19 should be closed, particularly in the winter when snow is likely to enter the machine. The deflector 25 should then be mounted as shown in Fig. 2. Assuming that the motor is operating under these conditions, the fan 24 produces a circulation of air from the longitudinal passages 20 and 22 outwardly through the fan and the passage 27, back between the polar projections 3 of the frame 1, around the field coils over the outer surface of the commutator cylinder 9 and through passages 32 to the passages 22.

The internal circulation of air thus created serves to prevent overheating of any of the parts of the motor by maintaining all of the parts at a substantially uniform temperature. Furthermore, the closed or internal circulation will usually be maintained only when there is danger of snow entering the motor and, consequently, when the temperature of the outside atmosphere, which is in contact with the exposed surfaces of the motor frame, is relatively low. It may also be found desirable to utilize the closed circulation when the motor is subjected to large quantities of dust and grit.

When there is no danger of snow or other foreign matter entering the motor frame, the grid 30 is preferably so positioned as to open the inlet openings 31, and the deflector 25 is mounted in the position shown in Fig. 1.

Under these conditions, the fan 24 forces the air outwardly from the passages 22 and 20 through the openings 13 and 14 in the housing 5. The hot air from the interior of the motor is thus continually removed and is replaced by relatively cool air which enters through the inlet opening 19, passes between the polar projections 3, around the field magnet coils 2, over the outer surface of the commutator cylinder 9 and through the passages 32.

While my invention is particularly well adapted for use with motors of the railway type, it is not limited for use in connection with any size or type of dynamo-electric machine, and I desired that only such limitations shall be imposed as are indicated in the appended claims.

I claim as my invention:

1. A motor comprising a stationary member, a rotatable member, a substantially closed casing, means for creating a circulation of air as the motor operates, and adjustable means for directing the circulation of air either in a closed circuit within the frame or in an open circuit including passages in the stationary and rotatable parts of the motor and openings to the outside atmosphere.

2. A dynamo-electric machine comprising a stator, an inclosing casing, a rotor, means for creating a circulation of air as the motor operates, and adjustable means for directing the circulation of air either in a closed circuit within the frame or in an open circuit including passages in the stator and rotor of the machine and openings to the outside atmosphere.

3. A dynamo-electric machine comprising a stator, an inclosing casing, a rotor, means forming a part of the rotatable member for creating a circulation of air, and adjustable means for directing the circulation of air either in a closed circuit within the frame or in an open circuit including passages in the stator and rotor of the machine, and openings to the outside atmosphere.

4. An electric motor comprising a substantially closed frame having relatively small inlet and outlet openings, a rotatable member, a fan carried by said member, a deflector secured to the stationary frame, and an adjustable damper for closing and opening the inlet in the frame, the deflector being adapted to be reversed and the damper to be adjusted to effect either a closed circulation of air within the casing or an open circulation through the inlet and outlet openings.

5. An electric motor comprising a substantially closed frame having relatively small inlet and outlet openings, a rotatable armature, a fan carried thereby, a reversible deflector secured to the stationary frame for directing the circulation of air produced by the fan, and an adjustable damper for closing and opening the inlet in the frame.

6. An electric motor comprising a substantially closed frame having relatively small inlet and outlet openings, a rotatable armature, a fan carried thereby, a reversible deflector secured to the stationary frame for directing the circulation of air produced by the fan, and an adjustable damper for closing and opening the inlet in the frame according to the position occupied by the deflector.

7. A dynamo-electric machine comprising relatively rotatable members, a substantially closed casing, means for creating a circulation of air as the machine operates and means for adapting said machine for external or for internal ventilation.

8. A dynamo-electric machine comprising relatively rotatable members, an inclosing casing therefor, means for creating a circulation of air as the machine is operated and means for converting the machine into either an internally ventilated machine or an externally ventilated machine.

9. In a dynamo-electric machine, the combination with relatively rotatable members, a frame substantially inclosing said members, and a fan associated with the rotatable member for creating a fluid circulation as the machine is operated, of means for adapting said machine for internal ventilation or for external ventilation.

10. In a dynamo-electric machine, the combination with relatively rotatable members, a frame substantially inclosing said members, and a fan associated with the rotatable member for creating a fluid circulation as the machine is operated, of means for directing the circulation of fluid either in a closed circuit within the frame or in an open circuit from the outside atmosphere through the frame and including passages in the stationary and rotatable members of the machine and openings in the inclosing frame.

11. In a dynamo-electric machine, the combination with relatively rotatable members, a frame substantially inclosing said members and a fan associated with the rotatable member for creating a fluid-circulation as the machine is operated, of adjustable means for directing the circulation of fluid either in a closed circuit within the frame or in an open circuit from the outside atmosphere through the frame.

12. A dynamo-electric machine comprising a stator, a rotor, an inclosing frame having openings therein, means associated with said rotor for creating a circulation of air when the machine is operating, and adjustable means for directing the circulation of air either in a closed circuit within the frame and including passages in the stator and the rotor or in an open circuit from the outside atmosphere through said passages and openings in said frame.

13. In a dynamo-electric machine, the combination with a stator, a rotor, and a frame substantially inclosing said parts and having openings in one end thereof, of means for creating a circulation of air when the machine is operating and removable means associated with the end of the frame having said openings and disposed intermediate said openings for the purpose of directing the circulation of ventilating air either through or away from said openings.

14. In a dynamo-electric machine, the combination with a stator, a rotor, and a frame substantially inclosing said parts and having openings in one end thereof, of a removable deflector disposed within said frame and between said end openings for directing the circulation of ventilating air.

15. In a dynamo-electric machine, the combination with a rotatable member having longitudinal openings therein, a cooperating stationary member having longitudinal passages therethrough, and a frame for substantially inclosing said members, one end of said frame having a plurality of openings, of a fan associated with said rotatable member for creating a circulation of air when said member is operated, and a removable deflecting plate attached to the end of said frame and disposed therein intermediate said end openings for directing the circulation of ventilating air.

16. A dynamo-electric machine comprising relatively rotatable members, a frame substantially inclosing said members and having an end opening, a bearing housing asociated with one end of said motor and having an opening therein, a deflecting plate removably secured to said bearing housing and disposed within said frame and intermediate the end opening of said frame and the housing opening.

17. A dynamo-electric machine comprising a substantially closed frame having relatively small inlet and outlet ventilating openings, a rotatable member, a fan carried thereby for producing air currents, a detachable deflector secured to said frame intermediate said inlet opening and said outlet opening for directing the air currents and means including said deflector for closing said inlet and said outlet openings.

18. A dynamo-electric machine comprising a substantially closed frame having inlet and outlet ventilating openings, a rotatable member, a fan carried thereby for producing air currents, a detachable deflector secured to said frame intermediate said openings for directing the air away from or through said outlet opening, and an adjustable damper for closing and opening said inlet opening.

19. A dynamo-electric machine comprising a substantially closed frame having relatively small inlet and outlet ventilating openings, a rotatable member, a fan carried thereby for producing air currents, an adjustable damper for governing one of said openings, a deflector disposed intermediate said openings and associated with said frame, said deflector being adapted to be detached and reversed in position to close one of said openings, whereby the machine may be adapted for external or internal ventilation.

20. A dynamo-electric machine comprising relatively rotatable members, a substantially closed frame having a plurality of inlet and outlet openings, means associated with the rotatable member for producing a circulation of air, and an annular diaphragm adapted to be positioned between said openings and to be utilized for closing certain of said openings.

21. A dynamo-electric machine comprising a substantially closed frame having relatively small inlet and outlet openings, a rotatable fan disposed within said frame for creating currents of air, and a reversible deflector detachably secured to said frame for directing the circulation of air produced by said fan, the position of said deflector being dependent upon the type of ventilating system desired.

22. A dynamo-electric machine comprising a substantially closed frame having relatively small inlet and outlet openings, a rotatable fan disposed within said frame for creating currents of air, a reversible deflector detachably secured to said frame for directing the circulation of air produced by said fan, said deflector being adapted to be positioned to separate said openings or to close one of said openings, and other means for closing and opening the other frame opening according to the position occupied by the deflector.

In testimony whereof, I have hereunto subscribed my name this 27th day of April, 1915.

WESTINGHOUSE ELECTRIC & MFG. COMPANY,

By T. P. GAYLORD,
*Acting Vice President.*

Witness:
B. B. HINES.

Copies of this patent may be obtained for five cents each, by addressing the "Commissioner of Patents, Washington, D. C."